(12) United States Patent
Van de Vyver et al.

(10) Patent No.: US 11,383,197 B2
(45) Date of Patent: Jul. 12, 2022

(54) CONTAMINANT REMOVAL PROCESS

(71) Applicant: Taminco BVBA, Ghent (BE)

(72) Inventors: Stijn Simonne Paul Van de Vyver, Ghent (BE); Robin Jacques Matton, Merelbeke (BE); Klaas Victor, Beveren (BE)

(73) Assignee: Taminco BVBA, Ghent (BE)

( * ) Notice: Subject to any disclaimer, the term of this patent is extended or adjusted under 35 U.S.C. 154(b) by 0 days.

(21) Appl. No.: 16/968,903

(22) PCT Filed: Feb. 13, 2019

(86) PCT No.: PCT/EP2019/053555
§ 371 (c)(1),
(2) Date: Aug. 11, 2020

(87) PCT Pub. No.: WO2019/158591
PCT Pub. Date: Aug. 22, 2019

(65) Prior Publication Data
US 2021/0046418 A1    Feb. 18, 2021

(30) Foreign Application Priority Data
Feb. 14, 2018  (EP) .................................. 18156822

(51) Int. Cl.
*B01D 53/14* (2006.01)
*C10L 3/10* (2006.01)

(52) U.S. Cl.
CPC ..... *B01D 53/1493* (2013.01); *B01D 53/1456* (2013.01); *C10L 3/103* (2013.01);
(Continued)

(58) Field of Classification Search
None
See application file for complete search history.

(56) References Cited

U.S. PATENT DOCUMENTS 3,733,779 A    5/1973  Bellisio et al.
4,085,192 A    4/1978  Van Scoy
(Continued)

FOREIGN PATENT DOCUMENTS

EP    0215911 A1    4/1987

OTHER PUBLICATIONS

Fischer, Kai, et al.; "Solubility of $H_2S$ and $CO_2$ in N-Octyl-2-pyrrolidone and of $H_2S$ in Methanol and Benzene"; AIChE Journal, Apr. 2002, vol. 48, No. 4; pp. 887-893.
(Continued)

*Primary Examiner* — Daniel Berns
(74) *Attorney, Agent, or Firm* — Kenrick L. Vidale

(57) ABSTRACT

Disclosed is a process comprising:
  step a) contacting a feed stream comprising a contaminant with an absorbent stream in a counter-current flow to produce a contaminant depleted product stream depleted in the molar quantity of the contaminant relative to the molar quantity of said contaminant in the feed stream, and a contaminant enriched absorbent stream enriched in the molar quantity of the contaminant relative to the molar quantity of said contaminant in the absorbent stream; and
  step b) treating the contaminant enriched absorbent stream to form a gaseous stream comprising said contaminant and a regenerated absorbent stream lean in the molar quantity of said contaminant relative to the molar quantity of said contaminant in the contaminant enriched absorbent stream; herein said absorbent stream comprises at least 15 wt. % of at least one compound (A) of general formula (I) or a mixture (M) comprising at least one compound (B) of general formula (II) and at least one compound (C) of general formula (III).

8 Claims, 1 Drawing Sheet

(52) U.S. Cl.
CPC .............. *B01D 2252/20468* (2013.01); *B01D 2257/304* (2013.01); *B01D 2257/308* (2013.01); *B01D 2257/504* (2013.01); *C10L 2290/12* (2013.01); *C10L 2290/541* (2013.01)

(56) References Cited

U.S. PATENT DOCUMENTS

| | | |
|---|---|---|
| 4,360,363 A | 11/1982 | Ferrin et al. |
| 4,405,585 A | 9/1983 | Sartori et al. |
| 4,484,934 A | 11/1984 | Ferrin et al. |
| 5,413,627 A | 5/1995 | Landeck et al. |
| 5,705,090 A | 1/1998 | Garland et al. |
| 8,313,718 B2 | 11/2012 | Bedell |
| 2006/0045830 A1* | 3/2006 | Streitberger ....... B01D 53/1493 423/228 |
| 2009/0299122 A1 | 12/2009 | Geers et al. |
| 2010/0154637 A1 | 6/2010 | Capdeville |
| 2016/0288046 A1 | 10/2016 | Laroche et al. |

OTHER PUBLICATIONS

Notification of Transmittal of the International Search Report and the Written Opinion of the International Searching Authority dated Oct. 5, 2019 for International Application No. PCT/EP2019/053555.

\* cited by examiner

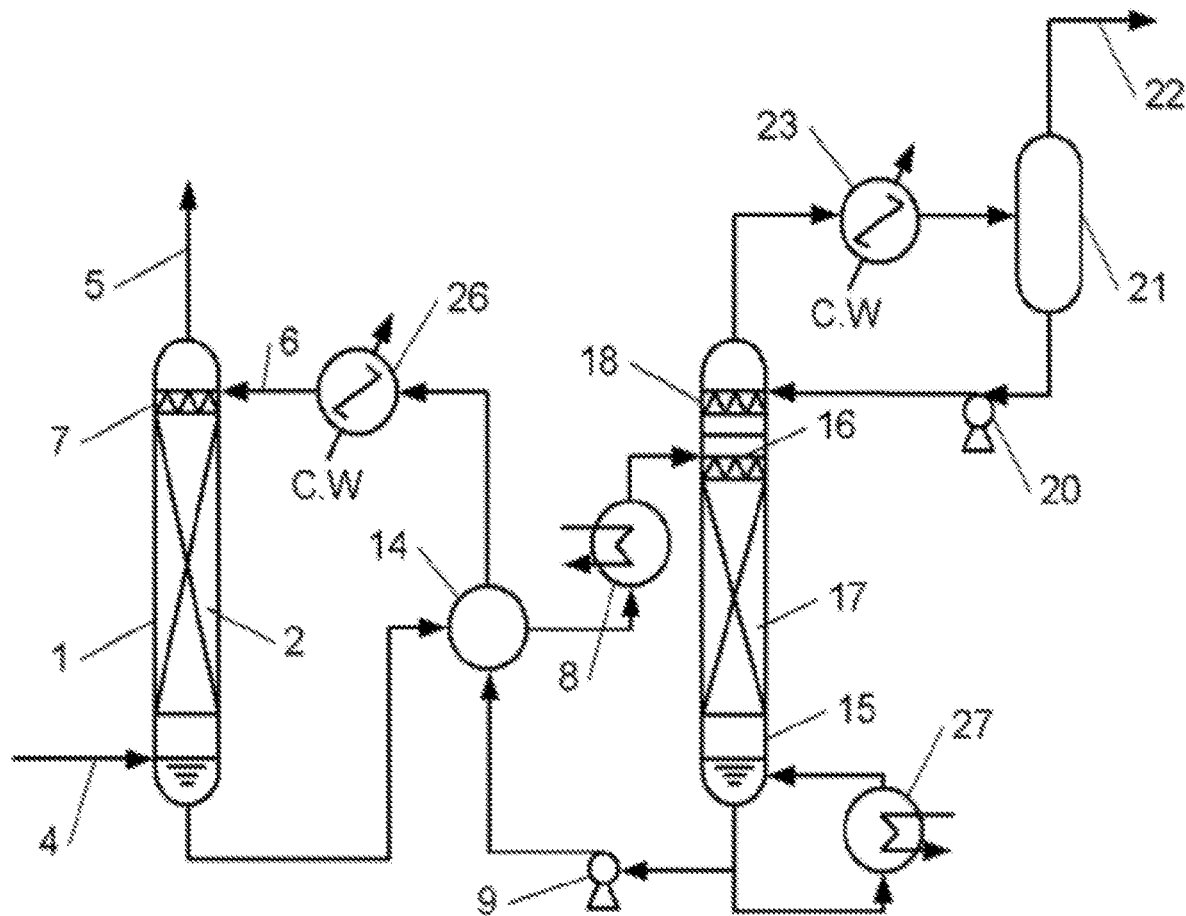

CONTAMINANT REMOVAL PROCESS

CROSS-REFERENCE TO RELATED APPLICATION(S)

This application is a national stage filing under 35 USC § 371 of International Application Number PCT/EP2019/053555, filed on, Feb. 13, 2019 which claims priority to European Application EP 18156822.1, filed on Feb. 14, 2018, the entire disclosures of which are incorporated by reference herein.

FIELD OF THE INVENTION

The present invention relates to an improved process for removing contaminants, in particular to an improved removal of mercaptans in the presence of other contaminants such as $H_2S$ and $CO_2$, from non-aqueous process streams, primarily gases but also including liquids.

BACKGROUND OF THE INVENTION

The removal of contaminants such as hydrogen sulfide ($H_2S$), carbon dioxide ($CO_2$), carbon oxysulfide (COS), carbon disulfide ($CS_2$), disulfides and mercaptans, from a wide variety of feed streams, in particular gaseous feed streams, is known to be important.

Such feed streams occur for example in the processing of natural gas. The gas from natural gas fields mainly comprises methane and may further comprise significant amounts of contaminants such as carbon dioxide, readily up to 70% volume, hydrogen sulfide, mercaptans and carbon oxysulfide. These contaminants may therefore need to be removed to reduce further transportation costs as compressed gas, to mitigate risk of corrosion in downstream systems and pipelines, to adjust the heating value of the gas in order to suit the consumer needs, and/or to enable the liquefaction of the natural gas into liquefied natural gas, LNG, a means of transport of increasing use to bring natural gas from a remote winning location to the gas consumption market.

Contaminant removal is also important in refinery streams such as the liquefied petroleum gas (LPG) fraction, the off-gases from fluid catalytic cracking (FCC), the hydrotreater off-gases, and the refinery gas usually contain significant amounts of mercaptans and/or $H_2S$, and in some also $CO_2$ may be present. The distillation fractions intended for the different fuel pools need to be desulfurized to alleviate the acid rain problem caused by SOx emissions in the flue gas after combustion. Several of these liquid fractions are therefore subjected to hydrodesulfurization, a refinery step which converts the heavier sulfur compounds into gaseous $H_2S$. In a so-called Claus plant, the $H_2S$ which is collected from all these sources may then be converted into elemental sulfur, which has become a product of commerce, for instance as feedstock for the production of sulfuric acid.

Furthermore, contaminant removal may be important in the production of synthesis gas, consisting primarily of $H_2$, CO and possibly also $N_2$, a gas which is in various forms an important chemical building block but also an important intermediate in the conversion of energy from solid carbon containing streams, such as solid waste streams, tar sands, oil shale and the like. It is usually desirable to remove mercaptans, $H_2S$ and $CO_2$ from the synthesis gas, because mercaptans and $H_2S$ may be an undesirable reactant therein and/or lead to emission of sulfur oxides (SOx) upon combustion, undesirable in view of the acid rain concerns and because the $CO_2$ may for instance act as a disturbing inert in the downstream process.

However, the simultaneous and efficient removal of mercaptans, H2S and $CO_2$ remains an important challenge, more so in view of the increasingly stringent environmental and technical requirements and the drive for a continuous cost reduction of gas processing plants.

The removal of contaminants from gases, and to a lesser extent also from organic liquids such as for instance LPG streams, is typically performed by washing the stream with an absorbent solution, usually at a relatively low temperature to favour the absorption of the contaminant. A major portion of the contaminant is absorbed in the absorbent solution, and the rich absorbent solution is then routed to a regeneration step for being regenerated. The lean absorbent solution from the regeneration step is then usually cooled and recycled to the absorption step. A typical absorbent solution contains absorbents of a basic nature, and amine compounds have been preferred over alternatives such as hot potassium carbonate. Even more preferred were alkanolamines. A conventional absorbent is for instance 2-hydroxyethyl amine, also known as monoethanol amine (MEA). The contaminants absorbed react with the alkanolamine present in solution according to a reversible exothermic reaction. With MEA, typically two molecules of MEA are required to absorb one molecule of $CO_2$. More complex, sterically hindered amines, including tertiary amines, were found to provide improved stoichiometry.

These types of solvents which undergo a chemical reaction with the contaminants and thereby form thermally regenerable salts, are often called chemical solvents in this context. Alkanolamines derived from primary, secondary and/or tertiary amines are the most widely used chemical solvents. The most frequently used amines are derived from ethanolamine, especially monoethanol amine (MEA), diethanolamine (DEA), triethanolamine (TEA), diisopropanolamine (DIPA) and methyldiethanolamine (MDEA). A disadvantage of such chemical solvents is that in the regeneration step, the chemical bond between the solvent and the contaminant needs to be broken which requires a large amount of energy. Especially the regeneration of solutions of primary and secondary alkanolamines consumes large volumes of steam. Since mercaptans are weaker acids, their removal by chemical solvents will not be efficient when H2S and CO2 are present because the latter react more quickly with the alkanolamines. Therefore, mercaptans can react chemically with alkanolamines but they are in competition with H2S and CO2.

As an alternative to chemical solvents, so-called physical solvents are often used for the capture of minor sulfuric components such as mercaptans. Physical solvents rely on a physical absorption process, the contaminants dissolve and thus are physically absorbed in the physical solvent. The energy of the bond with the contaminant is typically smaller than with most of the typical so-called chemical solvents. Typical physical solvents are sulfolane and its derivatives, aliphatic acid amides, N-methyl-2-pyrrolidone (NMP), methanol and mixtures of dialkylethers of polyethylene glycols (Selexol®, Union Carbide).

A mixture of a chemical and a physical solvent, so-called hybrid solvents, can be employed as well. Such hybrid solvents can achieve very low contaminant specifications in a single treating step through a combination of bulk contaminant removal by the physical solvent and stringent purification by the chemical solvent.

A well-known commercial hybrid solvent is the Sulfinol® solvent (Shell®) which is often used to treat refinery, natural, and synthesis gases. The Sulfinol® solvent is a mixture of sulfolane, an alkanolamine (either DIPA or MDEA), and water. The solution with DIPA, referred to as Sulfinol®-D, is usually selected when complete removal of $H_2S$ and $CO_2$ as well as deep removal of COS is required. The Sulfinol®-D solvent is used in most of the Sulfinol plants in operation worldwide. The solution with MDEA, referred to as Sulfinol®-M, is usually used for selective removal of $H_2S$ in the presence of $CO_2$ and is capable of partial removal of COS. U.S. Pat. No. 4,085,192 describes a process for the selective removal of $H_2S$ by using such a Sulfinol® type solvent comprising an alkanolamine and sulfolanes. The Sulfinol® solvents shows a good absorption capacity for $H_2S$, $CO_2$ as well as mercaptans, however, it also shows co-absorption of valuable hydrocarbons. Co-absorption of hydrocarbons should be avoided to reduce hydrocarbon losses in the separated contaminants.

US 2016/0288046 A1 relates to processes for removal of acidic sulfur constituents from fluid streams by using aqueous mixtures of an amine constituent and a physical solvent. The amine constituents are generally tertiary amines, such as notably 3-dimethylamino-1, 2-propanediol (DMAPD), 3-diethylaminopropane-1,2-diol, 2-hydroxymethyl-2-dimethylaminopropane-1,3-diol or 2-hydroxymethyl-2-diethylaminopropane-1,3-diol and sterically hindered amines such as 2-hydroxymethyl-2-methylaminopropane-1,3-diol and 2-methyl-2-hydroxyethylaminopropanol. Preferred physical solvents include mono-functional and di-functional alcohols having a dielectric constant of lower than about 20, such as methoxytriglycol (MTG), methoxydiglycol (MDG), ethoxytriglycol, butoxytriglycol and mixtures thereof or glycol ethers such as methyl capped poly-ethylene glycol ethers and methyl capped polypropylene glycol. US 2016/0288046 A1 is mainly concerned with the removal of acidic sulfur constituents, in particular selective removal of $H_2S$ from a gas stream comprising other contaminants, for example $N_2$, $CO_2$, $CH_4$, $C_2H_6$, $C_3H_8$, $H_2$, CO, $H_2O$, COS, HCN, $NH_3$, $O_2$, and/or mercaptans. In US 2016/0288046 A1, it was found that the dielectric properties of the amine constituent and the physical solvent was important. Hybrid solvents with a low permittivity are most preferred. No mention is made about the amount of co-absorption of hydrocarbons.

U.S. Pat. No. 8,313,718 discloses a process for removing $H_2S$ and $CO_2$ from a hydrocarbon gas stream also containing a mercaptan by using an absorption (scrubbing) composition comprising a solution of a chemical solvent or physical solvent or mixture thereof and an effective amount of a mercaptan inclusion compound, such as cyclodextrin, calixarene, cucurbituril, a cryptand or mixtures thereof. Alkanolamines including for example monoethanolamine (MEA), diethanolamine (DEA), triethanolamine (TEA), diisopropylamine (MDA), diglycolamine (DGA) and methyldiethanolamine (MDEA) are mentioned as chemical solvents. Cyclotetramethylene sulfone, aliphatic acid amides, N-alkylated pyrrolidones such as N-methylpyrrolidone and corresponding piperidones, methanol and mixtures of dialkylethers of polyethylene glycols are mentioned as useful physical solvents. U.S. Pat. No. 8,313,718 demonstrates that the addition of such mercaptan inclusion compounds increases the removal of mercaptans. A significant drawback of the process of U.S. Pat. No. 8,313,718 is that it requires a composition with an extra ingredient on top of the conventional hybrid solvent, which in turn creates extra raw material costs. No mention is made about the amount of co-absorption of hydrocarbons.

U.S. Pat. No. 5,413,627 discloses a process for the selective removal of sulfur compounds such as $H_2S$, COS, $CS_2$ and thiols in the presence of at least one of $H_2$, $N_2$, Ar, $CO_2$, CO and aliphatic hydrocarbons using a physical scrubbing agent. A heterocylic compound is used as a suitable physical scrubbing agent which need to have five or more ring atoms, of which 2 atoms are heteroatoms, one of which is nitrogen and the other of which is oxygen or nitrogen. The nitrogen atom present in the ring is/are either double bonded or single bonded but, if single bonded, the nitrogen is organo-substituted. A wide variety of scrubbing agents are disclosed. The physical scrubbing agent may further be used in a physically active scrubbing agent composite with compounds selected from a long list of various heterocycles. U.S. Pat. No. 5,412,627 is mainly concerned with the removal of sulfur compounds such as $H_2S$ in the presence of $CO_2$ and not with the effective simultaneous removal of mercaptans. No mention is made about the amount of co-absorption of hydrocarbons.

US 2009/0299122 A1 proposes a process for producing purified hydrocarbon gas which does not incur the risk of significant losses of hydrocarbon products. First the gas stream is partly purified by cooling the gas stream and removing any solidified and/or liquefied contaminants. The partly purified gas is then compressed and the compressed partly purified gas is further contacted with an absorbing liquid. The absorbing liquid may comprise an amine compound, such as alkanolamines, and may further comprise a physical solvent. According to US 2009/0299122 A1 suitable physical solvents include tetramethylene sulphone and derivatives, amides of aliphatic carboxylic acids, N-alkyl pyrrolidone, in particular N-methylpyrrolidine, N-alkyl piperidones, in particular N-methyl piperidone, methanol, ethanol, ethylene glycol, polyethylene glycols, mono- or di($C_1$-$C_4$)alkyl ethers of ethylene glycol or polyethylene glycols. It should be mentioned that US 2009/0299122 A1 does not describe any working examples. Therefore, US 2009/0299122 A1 does not provide any experimental evidence of an effective simultaneous removal of mercaptans and other contaminants such as $H_2S$ and $CO_2$ together with a reduced risk of significant losses of hydrocarbon products.

In the prior art, the solvent N-methyl-2-pyrrolidone (NMP) is often recommended as a physical solvent. However, NMP is under scrutiny because of concerns over its potential health effects. NMP has increasingly attracted attention as environmental regulators, first in California and more recently in the European Union, have sought to exercise control over the solvent primarily in markets where it represents an inhalation hazard. Furthermore, NMP is now known to cause reproductive toxicity (it is considered as being reprotoxic) and is being labeled in the EU as "reprotoxic category 2" as from the 1st of December 2010. Formulations containing >0.3% of NMP have to be labelled as such. Consequently, the use of the solvent is restricted to professional users. NMP has been placed on the REACH "Substance of Very High Concern" (SVHC) list and will expectedly, sooner or later, be put under authorization or restriction.

Therefore, there remains a need for a less toxic, more economical and a more environmentally friendly absorbent solution which is able to absorb mercaptans efficiently in the presence of other contaminants such as H2S and CO2 while maintaining an excellent performance in a conventional absorption-regeneration cycle and which further exhibits a negligible co-absorption of hydrocarbons.

SUMMARY OF THE INVENTION

The inventors have now surprisingly found that it is possible to provide an improved process fulfilling the above-mentioned needs.

The present invention provides a process comprising:
step a) contacting a feed stream comprising a contaminant with an absorbent stream in a counter-current flow to produce a contaminant depleted product stream depleted in the molar quantity of the contaminant relative to the molar quantity of said contaminant in the feed stream, and a contaminant enriched absorbent stream enriched in the molar quantity of the contaminant relative to the molar quantity of said contaminant in the absorbent stream; and
step b) treating the contaminant enriched absorbent stream to form a gaseous stream comprising said contaminant and a regenerated absorbent stream lean in the molar quantity of said contaminant relative to the molar quantity of said contaminant in the contaminant enriched absorbent stream;
wherein said absorbent stream comprises:
i. at least 15 weight percent (wt. % herein after), relative to the total weight of the absorbent stream, of at least one substituted 2-pyrrolidone of general formula (I) [compound (A), herein after]:

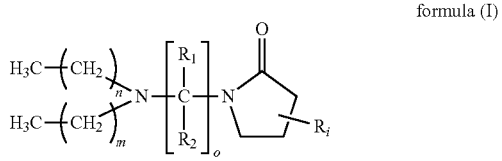

formula (I)

wherein:
each of $R_1$ and $R_2$, equal to or different from each other and at each occurrence, is independently selected from H or $CH_3$;
each of R, equal to or different from each other and at each occurrence, is selected from H or $CH_3$;
i is an integer in the range from 0 to 3;
o is an integer in the range from 2 to 6; n is an integer in the range from 0 to 4; m is an integer in the range from 0 to 4; or,
ii. a mixture [mixture (M), herein after] comprising at least one substituted 2-pyrrolidone of general formula (II) [compound (B), herein after], herein below, and at least one amine compound of general formula (III) [compound (C), herein after], herein below:

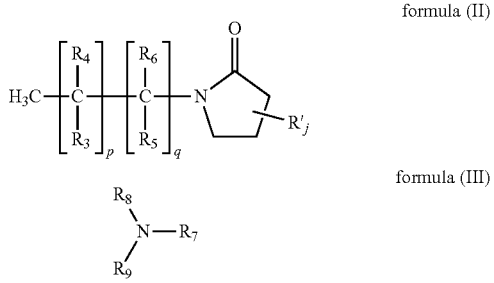

formula (II)

formula (III)

wherein:
each of R', equal to or different from each other and at each occurrence, is independently selected from H or $CH_3$
j is an integer in the range from 0 to 3
each of $R_3$, $R_4$, $R_5$ and $R_6$, equal to or different from each other and at each occurrence, is independently selected from H or $CH_3$;
q is an integer in the range from 0 to 1; p is an integer in the range from 1 to 6; with the proviso that when p=1 and q=0 then $R_3$ and $R_4$ are $CH_3$ and when p+q=2 then at least one of $R_3$, $R_4$, $R_5$ or $R_6$ is $CH_3$;
each of $R_7$, $R_8$ and $R_9$, equal to or different from each other and at each occurrence, is independently selected from H, $C_{1-10}$ alkyl, $C_{1-10}$ alkoxyalcohol or a $C_{1-10}$ alkanol group; with the proviso that at least one of $R_7$, $R_8$ or $R_9$ is a $C_{1-10}$ alkoxyalcohol or a $C_{1-10}$ alkanol group.

The present invention further provides for a composition comprising the mixture (M).

BRIEF DESCRIPTION OF THE DRAWINGS

FIG. 1 shows a schematic diagram of an apparatus suitable for removing contaminants from a gas stream.

DETAILED DESCRIPTION

The present invention will be described in the following with respect to particular embodiments and with reference to certain drawings but the invention is not limited thereto but only by the claims. Any drawings described are only schematic and are non-limiting. In the drawings, the size of some of the elements may be exaggerated and not drawn on scale for illustrative purposes. The dimensions and the relative dimensions do not necessarily correspond to actual reductions to practice of the invention.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the invention described herein can operate in other orientations than described or illustrated herein.

The term "comprising", used in the claims, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B. Accordingly, the terms "comprising" and "including" encompass the more restrictive terms "consisting essentially of" and "consisting of".

As used in the foregoing and hereinafter, the following definitions apply unless otherwise noted.

The term "alkyl"—alone or in combination means an alkane-derived radical, for example, CF-G alkyl defines a straight or branched alkyl radical having from F to G carbon atoms, e.g. C1-4 alkyl defines a straight or branched alkyl radical having from 1 to 4 carbon atoms such as for example methyl, ethyl, 1-propyl, 2-propyl, 1-butyl, 2-butyl, 2-methyl-2-propyl, 2-methyl-1-propyl. An alkyl group may be a straight chain alkyl or branched alkyl.

The term "alkanol"—alone or in combination means any alkyl group comprising one or more hydroxyl (—OH) functional groups, for example $C_{F-G}$ alkanol defines a straight or branched alkanol having from F to G carbon atoms, e.g. $C_{1-4}$ alkanol defines a straight or branched alkanol having from 1 to 4 carbon atoms. An alkanol group may be monohydric, dihydric, trihydric, or polyhydric and may be a straight chain alkanol or a branched chain alkanol.

The term "alkoxyalcohol"—alone or in combination means an organic compound of general formula X—O—Y, wherein X is an alkyl group substituted by —O—Y and wherein Y is an alkanol group. For example, $C_{F-G}$ alkoxyalcohol defines an alkoxyalcohol having from F to G carbon atoms in total, e.g. $C_{1-4}$ alkoxyalcohol defines an alkoxyalcohol group having from 1 to 4 carbon atoms such as for example ethoxyethanol, methoxyethanol, ethoxymethanol, methoxymethanol.

The term "alkanolamine" is intended to denote an amine compound comprising at least one alkanol group and wherein further substituents are selected among H, alkyl or alkanol groups. In this context, a primary alkanolamine comprises one alkanol group and two hydrogens bonded to the nitrogen atom, a secondary alkanolamine comprises at least one alkanol group and at least one hydrogen bonded to the nitrogen atom, a tertiary alkanolamine comprises at least one alkanol group and no hydrogen bonded to the nitrogen atom.

The term "at least one substituted 2-pyrrolidone of general formula (I)" is intended to denote one or more than one substituted 2-pyrrolidone of general formula (I). Mixtures of substituted 2-pyrrolidones of general formula (I) can also be used for the purpose of the invention. The term "at least one substituted 2-pyrrolidone of general formula (II)" is intended to denote one or more than one substituted 2-pyrrolidone of general formula (II). Mixtures of substituted 2-pyrrolidones of general formula (II) can also be used for the purpose of the invention. The term "at least one amine compound of general formula (III)" is intended to denote one or more than one amine compound of general formula (III). Mixtures of amine compounds of general formula (III) can also be used for the purpose of the invention.

It is understood that the term "quantity" relates to the property of being measurable in terms of amounts. The term "quantity" may denote the mass or weight or moles or any physical or in any case numerical parameter, unless otherwise specified, able to indicate at least, at quantity level, the presence either of a contaminant or of a mixture of contaminants.

Within the context of the present invention, the expression "contacting a feed stream comprising a contaminant with an absorbent stream in a counter-current flow" is intended to denote that an absorbent stream is contacting a feed stream comprising a contaminant in such a way that said absorbent stream and said feed stream are approaching each other in an opposite direction. It is further understood that the angle at which said streams approach each other may deviate from 180°.

Within the context of the present invention, at least one of the streams is a mobile stream. Therefore, at least the following three situations may occur: a static feed stream is contacted with a mobile, flowing absorbent stream is; a mobile, flowing feed stream is contacted with a static absorbent stream; or a mobile, flowing feed stream is contacted with a mobile, flowing absorbent stream. The term "at least one stream" is intended to denote one or more than one stream.

As discussed above, in the prior art, the solvent N-methyl-2-pyrrolidone (NMP) is often recommended as a physical solvent. The Applicants have now found that only specific substituted 2-pyrrolidones of general formula (I) and of general formula (II), as detailed above, characterised by having notably specific selections of o, n and m in formula (I) and p and q in formula (II), as defined above, can provide absorbent streams which are more efficient in removing mercaptans from a feed stream compared to NMP, as evidenced by the examples below.

The Applicants believe that in terms of chemical structure, the elongation of the chain attached to the nitrogen of the substituted 2-pyrrolidone of formula (I) or (II) according to the present invention to a total of at least four carbon atoms, appears to yield absorbent streams which are more efficient in removing mercaptans from a feed stream. As a further advantage, compounds with an elongated chain such as N-n-butyl-2-pyrrolidone were found to be non-reprotoxic.

The Applicants have further found that the specific selection of o, n and m in formula (I) and p and q in formula (II), as defined above, in terms of chemical structure also restricts the chain length of the chain attached to the nitrogen of the substituted 2-pyrrolidone of formula (I) or (II) according to the present invention, and appears to yield absorbent streams which maintain a low tendency towards co-absorption of hydrocarbons. This brings the advantage that less valuable hydrocarbon compounds are lost in the separated contaminants and further brings a higher process selectivity towards the contaminants.

In a preferred embodiment of the process according to the present invention, in compound (A) of general formula (I) i is an integer in the range from 0 to 1, more preferably in compound (A) of general formula (I) i is 0. In a preferred embodiment of the process according to the present invention, each of R1 and R2 in compound (A) of general formula (I) are H.

In a preferred embodiment of the process according to the present invention, in compound (A) of general formula (I) o is an integer in the range from 2 to 5, more preferably o is an integer in the range from 2 to 4, even more preferably o is an integer selected from 2 or 3.

In a preferred embodiment of the process according to the present invention, in compound (A) of general formula (I) n is an integer in the range from 0 to 3, more preferably n is an integer in the range from 0 to 2, even more preferably n is an integer selected from 0 or 1, most preferably in compound (A) of general formula (I) n is 0.

In a preferred embodiment of the process according to the present invention, in compound (A) of general formula (I) m is an integer in the range from 0 to 3, more preferably m is an integer in the range from 0 to 2, even more preferably m is an integer selected from 0 or 1, most preferably in compound (A) of general formula (I) m is 0.

In a preferred embodiment of the process according to the present invention, in compound (B) of general formula (II) j is an integer in the range from 0 to 1, more preferably in compound (B) of general formula (II) j is 0.

In one embodiment of the process according to the present invention, each of $R_5$ and $R_6$ in compound (B) of general formula (II) is H, each of $R_3$ and $R_4$ in compound (B) of general formula (II) equal to or different from each other and at each occurrence, is independently selected from H or $CH_3$, q is 1, p is an integer in the range from 1 to 6; with the proviso that when p+q=2 then at least one of $R_3$, $R_4$, $R_5$ or $R_6$ is $CH_3$.

In a preferred embodiment of the process according to the present invention, each of R3, R4, R5 and R6 in compound (B) of general formula (II) is H, q is 1 and p is an integer in the range from 2 to 6.

In a more preferred embodiment of the process according to the present invention, each of $R_3$, $R_4$, $R_5$ and $R_6$ in compound (B) of general formula (II) is H, q is 1 and p is 2, 3 or 4, more preferably p is 2.

In one embodiment of the process according to the present invention, each of R7, R8 and R9 in compound (C) of general formula (III), are independently selected from H, C1-5 alkyl, C1-5 alkoxyalcohol or C1-5 alkanol group; with the proviso that at least one of R7, R8 or R9 is a C1-5 alkoxyalcohol or C1-5 alkanol group.

In another embodiment of the process according to the present invention, each of R7, R8 and R9 in compound (C) of general formula (III), are independently selected from H, C1-5 alkyl or C1-5 alkanol group; with the proviso that at least two of R7, R8 or R9 are a C1-5 alkanol group.

In yet another embodiment of the process according to the present invention, each of R7, R8 and R9 in compound (C) of general formula (III), are independently selected from C1-5 alkyl or C1-5 alkanol group; with the proviso that at least one of R7, R8 or R9 is a C1-5 alkanol group.

In a preferred embodiment of the process according to the present invention, each of R7 and R8 in compound (C) of general formula (III) are an C1-5 alkanol group and R9 is selected from a C1-5 alkyl or C1-5 alkanol group.

In a more preferred embodiment of the process according to the present invention, each of $R_7$ and $R_8$ in compound (C) of general formula (III) are an $C_{1-5}$ alkanol group and $R_9$ is a $C_{1-5}$ alkyl group. More preferably, each of $R_7$, and $R_8$ are an $C_{1-4}$ alkanol group and $R_9$ is a $C_{1-4}$ alkyl group. Even more preferably, each of $R_7$, and $R_8$ are an $C_{1-3}$ alkanol group and $R_9$ is a $C_{1-3}$ alkyl group.

In compounds (A) of the absorbent stream as used in step a) of the process according to the present invention, preferably $R_1$ and $R_2$ are H and i is 0. Preferred compounds (A) are thus selected from those of formula (I-a) herein below:

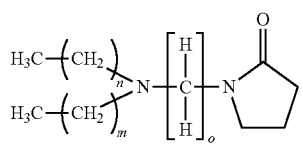

(formula I-a)

wherein:
    o is an integer in the range from 2 to 4; n is an integer selected from 0 or 1; m is an integer selected from 0 or 1.

Typical compounds (A) suitable for use in step a) of the process of the present invention may include, but are not limited to, dimethylaminopropyl-2-pyrrolidone (DMAP-2-pyrrolidone), dimethylaminoethyl-2-pyrrolidone (DMAE-2-pyrrolidone), diethylaminopropyl-2-pyrrolidone (DEAP-2-pyrrolidone) or a mixture of two or more thereof.

More preferably, in compounds (A) comprised in the absorbent stream as used in step a) of the process according to the present invention, o is an integer in the range from 2 to 4; n is 0 and m is 0. More preferred compounds (A) are thus selected from those of formula (I-b) herein below:

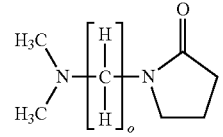

formula (I-b)

wherein:
    o is an integer in the range from 2 to 4.

According to a preferred embodiment of the process according to the present invention, the compounds (A) are selected from those of formula (I-c) or formula (I-d) herein below:

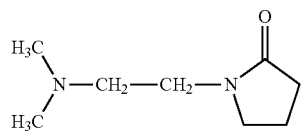

formula (I-c)

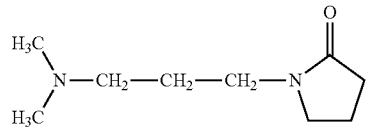

formula (I-d)

The inventors have found that compound (A) as specified herein, as comprised in the absorbent stream in step a) of the process according to the present invention, can simultaneously act as a physical solvent and as a chemical solvent, thereby forming a so-called hybrid solvent on its own. Without being bound to this theory, the inventors believe that the pyrrolidone ring in compound (A) offers an increased ability to dissolve mercaptans while the tertiary amine substituent on the pyrrolidone ring in compound (A) can react with other contaminants such as $CO_2$ and $H_2S$.

The inventors have further found that when compound (A) is used in the absorbent stream, a minimum amount of 15 wt. % of compound (A), relative to the total weight of the absorbent stream, is required to achieve an effective removal of mercaptans in the presence of other contaminants such as $H_2S$ and $CO_2$.

In compounds (B) comprised in the mixture (M) as used in step a) of the process according to the present invention, preferably $R_5$ and $R_6$ are H and j is 0. Preferred compounds (B) are thus selected from those of formula (II-a) herein below:

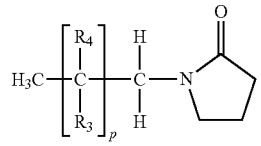

(formula II-a)

wherein:
    each of $R_3$ and $R_4$, are independently selected from H or $CH_3$;
    q is 1; p is an integer in the range from 2 to 6.

Typical compounds (B) suitable for use in step a) of the process of the present invention may thus include, but are not limited to, specific N-alkyl 2-pyrrolidones such as N-n-butyl-2-pyrrolidone, N-sec-butyl-2-pyrrolidone, N-isobutyl-2-pyrrolidone, N-tert-butyl-2-pyrrolidone, N-n-pentyl-2-pyrrolidone, N-sec-pentyl-2-pyrrolidone, N-tert-pentyl-2-pyrrolidone, N-3-pentyl-2-pyrrolidone, N-isopentyl-2-pyrrolidone, N-neopentyl-2-pyrrolidone, N-n-hexyl-2-pyrrolidone, N-n-heptyl-2-pyrrolidone, N-n-octyl-2-pyrrolidone, or a mixture of two or more thereof.

The inventors have found that in terms of chemical structure, elongation of the carbon chain attached to the nitrogen of the pyrrolidone ring in compound (B) as used in step a) according to the present invention, to at least four carbon atoms yields absorbent streams which are more effective in removing mercaptans from a feed stream compared to NMP, as evidenced by the examples below and furthermore are non-reprotoxic. The inventors have further found that compounds (B) according to the present invention, in which the carbon chain attached to the nitrogen of the pyrrolidone ring is restricted to at most 8 carbon atoms, maintain a low tendency towards co-absorption of hydrocarbons.

More preferably, in compounds (B) comprised in the mixture (M) as used in step a) of the process according to the present invention, $R_3$, $R_4$, $R_5$ and $R_6$ are H and j is 0. More preferred compounds (B) are thus selected from those of formula (II-b) herein below:

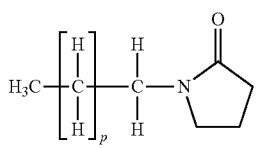

(formula II-b)

wherein:
p is an integer in the range from 2 to 6.

According to one embodiment of the process according to the present invention, the compounds (B) are selected from those of formula (II-c) to formula (II-g) herein below:

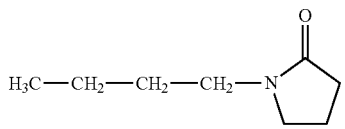

(formula II-c)

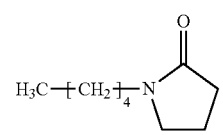

(formula II-d)

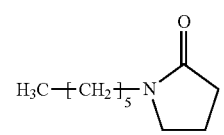

(formula II-e)

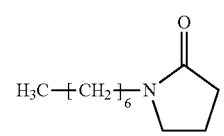

(formula II-f)

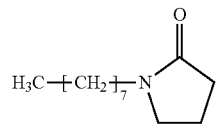

(formula II-g)

According to a preferred embodiment of the process according to the present invention, the compounds (B) are selected from those of formula (II-c) to formula (II-e), as specified here above.

According to a more preferred embodiment, the compound (B) in the absorbent stream as used in step a) of the process according to the present invention, is a compound of formula (II-c):

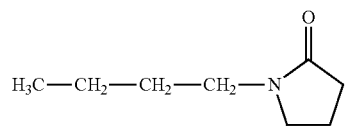

(formula II-c)

In compounds (C) comprised in the mixture (M) as used in step a) of the process according to the present invention, preferably each of R7, R8 and R9, are independently selected from H, C1-4 alkyl, C1-4 alkoxyalcohol or C1-4 alkanol group; with the proviso that at least one of R7, R8 or R9 is a C1-4 alkoxyalcohol or C1-3 alkanol group.

Typical compounds (C) suitable for use in step a) of the process of the present invention may include primary, secondary and tertiary alkanolamines such as, but not limited to, monoethanolamine (MEA), diethanolamine (DEA), triethanolamine (TEA), monomethylmonoethanolamine (MMEA), diethylmonoethanolamine, diisopropanollamine (DIPA), diglycolamine (DGA), and methyldiethanolamine (MDEA) or a mixture of two or more thereof.

Preferably, the compounds (C) comprised in the mixture (M) as used in step a) of the process of the present invention are chosen among tertiary alkanolamines such as notably, triethanolamine (TEA), diethylmonoethanolamine and methyldiethanolamine (MDEA). More preferably, the compounds (C) comprised in the absorbent stream as used in step a) of the process of the present invention is methyldiethanolamine (MDEA).

The inventors have found that even in the presence of a compound (B) and comprised in a mixture (M) as used in step a) of the process according to the present invention, tertiary alkanolamines rarely form irreversible components with impurities. Furthermore, tertiary alkanolamines comprised in a mixture (M) bring the advantage to be more stable thermally and chemically under typical operating conditions and usually they require less energy to be regenerated.

In certain embodiments, the compound (C) comprised in the mixture (M) as used in step a) of the process according to the present invention is diglycolamine (DGA).

A non-limitative example of a commercially available tertiary alkanolamine is AdapT® 100 which is available from the Eastman Chemical Company.

It is further understood that all definitions and preferences as described for compound (A) and compound (C) above equally apply for this embodiment and all further embodiments, as described below.

As said above, the absorbent stream in step a) of the process according to the present invention comprises at least 15 wt. %, relative to the total weight of the absorbent stream, of at least one compound (A) of general formula (I), as detailed above.

Advantageously, the weight percent of the compound (A) comprised in the absorbent stream as used in step a), relative to the total weight of the absorbent stream, is equal to or greater than 20 wt. %, preferably equal to or greater than 25 wt. %, preferably equal to or greater than 30 wt. %, preferably equal to or greater than 35 wt. %, preferably equal to or greater than 40 wt. %, preferably equal to or greater than 45 wt. %, preferably equal to or greater than 50 wt. %, preferably equal to or greater than 55 wt. %, preferably equal to or greater than 60 wt. %, preferably equal to or greater than 65 wt. %, preferably equal to or greater than 70 wt. %, preferably equal to or greater than 75 wt. %, preferably equal to or greater than 80 wt. %, preferably equal to or greater than 85 wt. %, preferably equal to or greater than 90 wt. %, preferably equal to or greater than 95 wt. %, preferably equal to or greater than 98 wt. %.

It is further understood that, the upper value of the weight percent of the compound (A) comprised in the absorbent stream as used in step a), relative to the total weight of the absorbent stream, is not particularly limited but is advantageously equal to or less than 99 wt. %, preferably equal to or less than 95 wt. %, preferably equal to or less than 90 wt. %, preferably equal to or less than 85 wt. %.

As explained above, the inventors have found that compounds (A) can simultaneously act as a physical solvent and as a chemical solvent. Therefore, compounds (A) can be used as a solvent as a part of the absorbent stream or as an absorbent stream as such.

In one embodiment, the absorbent stream in step a) of the process according to the present invention consists essentially of compounds (A) of general formula (I), as detailed above.

For the purpose of the present invention, the expression "consists essentially of" is intended to denote that any additional ingredient is present in an amount of at most 5 wt. %, preferably at most 2 wt. %, relative to the total weight of the absorbent stream. For example, any additional ingredient, different from compound (A), as detailed above, is present in an amount of at most 5 wt. %, preferably at most 2 wt. %, relative to the total weight of the absorbent stream.

The inventors have further found that when the compound (A), as detailed above, is further mixed with a compound (C) of general formula (III), as detailed above, good results were also obtained.

According to a preferred embodiment, the absorbent stream in step a) of the process according to the present invention comprises at least 15 wt. %, relative to the total weight of the absorbent stream, of at least one compound (A) of general formula (I), as detailed above, and further comprises at least one compound (C) of general formula (III), as detailed above.

Advantageously, the at least one amine compound (C) of general formula (III) is comprised in the absorbent stream in an amount corresponding to a weight ratio of the compound (C) to the compound (A) of at least 0.5:1, preferably at least 0.75:1, more preferably at least 1:1, even more preferably at least 1.5:1, yet even more preferably at least 1.75:1. It is further understood that a weight ratio of the compound (C) to the compound (A) in the absorbent stream is generally at most 5:1, preferably at most 4:1, more preferably at most 3.5:1, more preferably at most 3:1, more preferably at most 2.5:1.

According to certain embodiments of the present invention, the absorbent streams as used in step a) of the process of the present invention may further comprise water.

When water is present in the absorbent stream, then the water is present in the absorbent stream in an amount of at least 0.5 wt. %, preferably of at least 5 wt. %, preferably of at least 10 wt. %, more preferably at least 15 wt. %, even more preferably at least 20 wt. %, and even more preferably at least 22 wt. %, relative to the total amount of all components of the absorbent stream.

It is further understood that the water is present in the absorbent stream in an amount of at most 85 wt. %, preferably of at most 70 wt. %, more preferably at most 60 wt. %, even more preferably at most 50 wt. %, more preferably at most 40 wt. %, even more preferably at most 30 wt. %, more preferably at most 28 wt. %, relative to the total amount of all components of the absorbent stream.

According to a more preferred embodiment, the absorbent stream in step a) of the process according to the present invention comprises a composition [composition (C), herein after], comprising at least 15 wt. % of at least one compound (A) of general formula (I), as detailed above, relative to the total weight of the composition (C), at least one compound (C) of general formula (III), as detailed above, and water.

Advantageously, the water is comprised in composition (C) in an amount corresponding to a weight ratio of the water to the compound (A) of at least 0.25:1, preferably at least 0.3:1, more preferably at least 0.4:1, even more preferably at least 0.6:1, yet even more preferably at least 0.9:1. It is further understood that the weight ratio of the water to the compound (A) in the composition (C) is generally at most 4:1, preferably at most 3:1, more preferably at most 2.5:1, even more preferably at most 2:1, even more preferably at most 1.5:1, even more preferably at most 1.1:1.

Advantageously, the weight percent of the compound (A) comprised in the composition (C) as used in step a), relative to the total weight of the composition (C), is advantageously equal to or greater than 18 wt. %, preferably equal to or greater than 20 wt. %, more preferably equal to or greater than 21 wt. %, even more preferably equal to or greater than 22 wt. %.

It is further understood that, the upper value of the weight percent of the compound (A) comprised in the composition (C) as used in step a), relative to the total weight of the composition (C), is not particularly limited but is advantageously equal to or less than 50 wt. %, preferably equal to or less than 40 wt. %, more preferably equal to or less than 35 wt. %, even more preferably equal to or less than 30 wt. %, even more preferably equal to or less than 29 wt. %, most preferably equal to or less than 28 wt. %.

Advantageously, the weight percent of the compound (C) comprised in the composition (C) as used in step a), relative to the total weight of the composition (C), is advantageously equal to or greater than 2 wt. %, preferably equal to or greater than 5 wt. %, preferably equal to or greater than 10 wt. %, more preferably equal to or greater than 20 wt. %, even more preferably equal to or greater than 30 wt. %, yet even more preferably equal to or greater than 40 wt. %, most preferably equal to or greater than 45 wt. %.

It is further understood that, the upper value of the weight percent of the compound (C) comprised in the composition (C) as used in step a), relative to the total weight of the composition (C), is advantageously equal to or less than 85 wt. %, preferably equal to or less than 80 wt. %, more preferably equal to or less than 75 wt. %, more preferably equal to or less than 70 wt. %, more preferably equal to or less than 65 wt. %, even more preferably equal to or less than 60 wt. %, yet even more preferably equal to or less than 55 wt. %.

It is further understood that all definitions and preferences as described for compound (B) and compound (C) above equally apply for this embodiment and all further embodiments, as described below.

As said above, the absorbent stream in step a) of the process according to the present invention may comprise a mixture (M), as detailed above.

According to one embodiment of the process according to the present invention, the at least one compound (B) of general formula (II) is advantageously comprised in the mixture (M) in an amount corresponding to a weight ratio of the compound (B) to the compound (C) of at least 0.05:1, preferably at least 0.1:1, more preferably at least 0.2:1, more preferably at least 0.3:1, more preferably at least 0.35:1, even more preferably at least 0.4:1, yet even more preferably at least 0.45:1. It is further understood that a weight ratio of the compound (C) to the compound (A) in the mixture (M) is generally at most 2:1, preferably at most 1.5:1, more preferably at most 1:1, more preferably at most 0.75:1 even more preferably at most 0.65:1, yet even more preferably at most 0.55:1.

In a preferred embodiment of the process according to the present invention, the weight percent of the compound (B) comprised in the mixture (M) as used in step a), relative to the total weight of the mixture (M), is advantageously equal to or greater than 5 wt. %, preferably equal to or greater than 10 wt. %, more preferably equal to or greater than 15 wt. %, more preferably equal to or greater than 18 wt. %, more preferably equal to or greater than 20 wt. %, even more preferably equal to or greater than 22 wt. %, yet even more preferably equal to or greater than 25 wt. %.

It is further understood that, the upper value of the weight percent of the compound (B) comprised in the mixture (M) as used in step a), relative to the total weight of the mixture (M), is advantageously equal to or less than 50 wt. %, preferably equal to or less than 45 wt. %, more preferably equal to or less than 40 wt. %, more preferably equal to or less than 35 wt. %, more preferably equal to or less than 30 wt. %, even more preferably equal to or less than 29 wt. %, most preferably equal to or less than 28 wt. %.

In a preferred embodiment of the process according to the present invention, the weight percent of the compound (C) comprised in the mixture (M) as used in step a), relative to the total weight of the mixture (M), is advantageously equal to or greater than 2 wt. %, preferably equal to or greater than 5 wt. %, preferably equal to or greater than 10 wt. %, more preferably equal to or greater than 20 wt. %, even more preferably equal to or greater than 30 wt. %, yet even more preferably equal to or greater than 40 wt. %, most preferably equal to or greater than 45 wt. %.

It is further understood that, the upper value of the weight percent of the compound (C) comprised in mixture (M) as used in step a), relative to the total weight of the mixture (M), is advantageously equal to or less than 85 wt. %, preferably equal to or less than 80 wt. %, more preferably equal to or less than 75 wt. %, more preferably equal to or less than 70 wt. %, more preferably equal to or less than 65 wt. %, even more preferably equal to or less than 60 wt. %, yet even more preferably equal to or less than 55 wt. %.

According to one embodiment, the absorbent stream as used in step a) of the process according to the present invention consists essentially of:
- 15 wt. %-40 wt. % of at least one compound (A) of general formula (II), as defined above,
- 30 wt. %-65 wt. % of at least one compound (C) of general formula (III), as defined above,
- 15 wt. %-40 wt. % of water, all wt. % are relative to the total weight of the absorbent stream.

It is further understood that in this embodiment, any additional ingredient, different from compound (A), as detailed above, compound (C), as detailed above, and water, is present in an amount of at most 5 wt. %, preferably at most 2 wt. %, relative to the total weight of the absorbent stream.

Preferably, the mixture (M) as used in step a) of the process according to the present invention further comprises water.

In this preferred embodiment of the process according to the present invention, the weight percent of the compound (B) comprised in the mixture (M) as used in step a), relative to the total weight of the mixture (M), is advantageously equal to or greater than 5 wt. %, preferably equal to or greater than 10 wt. %, more preferably equal to or greater than 15 wt. %, more preferably equal to or greater than 18 wt. %, more preferably equal to or greater than 20 wt. %, even more preferably equal to or greater than 22 wt. %.

It is further understood that the upper value of the weight percent of the compound (B) comprised in the mixture (M) as used in step a), relative to the total weight of the mixture (M), is advantageously equal to or less than 50 wt. %, preferably equal to or less than 45 wt. %, more preferably equal to or less than 40 wt. %, more preferably equal to or less than 35 wt. %, more preferably equal to or less than 30 wt. %, even more preferably equal to or less than 28 wt. %.

In a preferred embodiment of the process according to the present invention, the weight percent of the compound (C) comprised in mixture (M) as used in step a), relative to the total weight of the mixture (M), is advantageously equal to or greater than 2 wt. %, preferably equal to or greater than 5 wt. %, preferably equal to or greater than 10 wt. %, more preferably equal to or greater than 20 wt. %, even more preferably equal to or greater than 30 wt. %, yet even more preferably equal to or greater than 40 wt. %, most preferably equal to or greater than 45 wt. %.

It is further understood that the upper value of the weight percent of the compound (C) comprised in the mixture (M) as used in step a), relative to the total weight of the mixture (M), is advantageously equal to or less than 70 wt. %, preferably equal to or less than 65 wt. %, more preferably equal to or less than 60 wt. %, even more preferably equal to or less than 55 wt. %.

According to one embodiment of the process according to the present invention, the water is typically added to mixture (M) in an amount corresponding to a weight ratio of the water to the compound (B) of at least 0.25:1, preferably at least 0.3:1, more preferably at least 0.4:1, even more preferably at least 0.6:1, yet even more preferably at least 0.9:1. It is further understood that a weight ratio of the water to the compound (B) in the absorbent stream is generally at most 4:1, preferably at most 3:1, more preferably at most 2.5:1, even more preferably at most 2:1, yet even more preferably at most 1.1:1.

Good results were obtained when the weight percent of the compound (B) comprised in the mixture (M) as used in step a), relative to the total weight of the mixture (M), is from 10-35 wt. %, the weight percent of the compound (C) in the mixture (M) as used in step a), relative to the total weight of the mixture (M), is between 30-65 wt. % and the weight percent of the water comprised in the mixture (M) as used in step a), relative to the total weight of the mixture (M), is from 15-40 wt. %.

According to a preferred embodiment, the absorbent stream as used in step a) of the process according to the present invention comprises:
  10 wt. %-35 wt. % of at least one compound (B) of general formula (II), as defined above,
  30 wt. %-65 wt. % of at least one compound (C) of general formula (III), as defined above,
  15 wt. %-40 wt. % of water, all wt. % are relative to the total weight of the absorbent stream.

According to another embodiment, the absorbent stream as used in step a) of the process according to the present invention consist essentially of:
  10 wt. %-35 wt. % of at least one compound (B) of general formula (II), as defined above,
  30 wt. %-65 wt. % of at least one compound (C) of general formula (III), as defined above,
  15 wt. %-40 wt. % of water, all wt. % are relative to the total weight of the absorbent stream.

It is further understood that in this embodiment, any additional ingredient, different from compound (B), as detailed above, compound (C), as detailed above, and water, is present in an amount of at most 5 wt. %, preferably at most 2 wt. %, relative to the total weight of the absorbent stream.

If desired, the absorbent stream may further comprise an accelerator for the reaction of the absorbent stream with at least one of the contaminants, in particular for the reaction with carbon dioxide. The accelerator brings a clear improvement to the kinetics of the system, absorption rates are faster, loading amounts are higher, absorbent stream/feed stream ratios are lower, design of the plant may be smaller and the regeneration heat requirement may be lower, resulting in less cooling capacity. A lower absorbent stream/feed stream ratio, may result in a smaller design of the plant, absorber as well as regenerator. Alternatively, when using the same absorbent stream/feed stream ratio, an often considerably larger amount of contaminants may be removed.

Advantageously, the weight percent of the accelerator as comprised in the absorbent stream as used in step a), relative to the total weight of the absorbent stream, is from 0.1 to 20 wt. %, preferably at least 0.5 wt. %, preferably at least 1 wt. %, preferably at least 1.5 wt. %, preferably at least 2 wt. %, preferably at least 2.5 wt. %, and either alternatively or in combination therewith at most 18 wt. % by weight, preferably at most 16 wt. %, preferably at most 14 wt. %, preferably at most 12 wt. %, preferably at most 10 wt. %, preferably at most 9 wt. %, even more preferably at most 8.5 wt. %.

Typical accelerators suitable for use in the absorbent stream as used in step a) of the process of the present invention may thus include, but are not limited to, amines, alcohols, ketones, vinyl alcohols, vinyl ketones, ether alcohols, ether ketones, glycols, polyethylene glycols, polypropylene glycols, ethylene glycolpropylene glycol copolymers, glycol ethers, thioglycols, thioalcohols, sulfones, sulfoxide, N-alkylated 2-pyrrolidones, N-alkylated piperidones, cyclotetramethylenesulfones, N-alkylformamides, N-alkylacetamides, alkyl phosphates, alkylene carbonates and/or dialkyl carbonates. More preferred candidates are monoethanol amine (MEA), diethanol amine (DEA), monomethyl ethanolamine (MMEA), piperazine, 2-methylpiperazine, N-methyl piperazine, N-ethyl piperazine, N-hydroxyethyl piperazine (HEP), N-(2-aminoethyl) piperazine, homopiperazine, piperidine and morpholine. Most preferred as accelerator is piperazine.

In general, the feed stream comprises at least one contaminant selected from mercaptans, hydrogen sulfide (H2S), carbon dioxide ($CO_2$), carbon oxysulfide (COS), carbon disulfide, (CS2), and disulfides.

In particular, the feed stream comprises mercaptans and at least one other contaminant selected from H2S, CO2, COS, CS2 and disulfides.

We have found that mercaptans are removed efficiently from feed streams even in the presence of other contaminants such as $H_2S$ and CO2. The inventors have found that compound (B) as specified herein, can act as a physical solvent while compound (C) as specified herein, can act as a chemical solvent, thereby forming a so-called hybrid solvent. The inventors believe that the pyrrolidone ring in compound (B) offers an increased ability to dissolve mercaptans while the amine compound (C) is able to react with other contaminants such as $CO_2$ and $H_2S$. Alternatively, the compound (A) as specified herein, can simultaneously act as a physical solvent and as a chemical solvent, thereby forming a so-called hybrid solvent on its own. The inventors believe that the pyrrolidone ring in compound (A) offers an increased ability to dissolve mercaptans while the tertiary amine substituent on the pyrrolidone ring in compound (A) can react with other contaminants such as $CO_2$ and $H_2S$.

It is understood that in the step a), the molar quantity of the contaminant in the contaminant depleted product stream, relative to the molar quantity of the contaminant in the feed stream, is reduced. Furthermore, the molar quantity of the contaminant in the enriched absorbent stream, relative to the molar quantity of the contaminant in the absorbent stream, has been increased.

The molar quantity of the contaminant in the contaminant depleted product stream, relative to the molar quantity of the contaminant in the feed stream, is reduced by at least 5%, preferably at least 10%, more preferably at least 20%, even more preferably at least 30%, yet even more preferably at least 40% and most preferably at least 50%.

The molar quantity of the contaminant in the enriched absorbent stream, relative to the molar quantity of the contaminant in the absorbent stream, has been increased by at least 5%, preferably at least 10%, more preferably at least 20%, even more preferably at least 30%, yet even more preferably at least 40% and most preferably at least 50%.

The molar quantity of mercaptans in the contaminant depleted product stream, relative to the molar quantity of mercaptans in the feed stream, is reduced by at least 5%, preferably at least 10%, more preferably at least 20%, even more preferably at least 30%, yet even more preferably at least 40% and most preferably at least 50%.

Typical feed streams as used in step a) of the process according to the present invention, such as natural gas or refinery gas streams and synthesis gas, may comprise valuable hydrocarbons such as olefins and alkanes, for example methane, ethane, propane, butane, pentane, hexane, heptane and octane.

It is understood that in the enriched absorbent stream produced in step a) of the process of the present invention, the molar quantity of hydrocarbons, relative to the molar quantity of the hydrocarbons in the feed stream remains low.

In one embodiment of the process according to the present invention, the feed stream comprises carbon dioxide, and the amount of CO2 in the feed stream to step a) is at least 5 volume % [vol. %, herein after], preferably at least 10 vol. %, preferably at least 15 vol. %, preferably at least 20 vol. %, preferably at least 25 vol. %, preferably at least 30 vol. %, preferably at least 35 vol. %, preferably at least 40 vol. %, preferably at least 45 vol. %, preferably at least 50 vol. %, preferably at least 55 vol. %, preferably at least 60 vol. %, preferably at least 65 vol. %.

In one embodiment of the process according to the present invention, the feed stream comprises hydrogen sulfide, and the amount of hydrogen sulfide in the feed stream to step a) is at least 1 vol. %, preferably at least 5 vol. %, preferably at least 8 vol. %, preferably at least 10 vol. %, preferably at least 12 vol. %, preferably at least 15 vol. %, preferably at least 18 vol. %.

In one embodiment of the process according to the present invention, the feed stream comprises carbon oxysulfide, and the amount of carbon oxysulfide in the feed stream to step a) is at least 0.1 ppmv, preferably at least 0.5 ppmv, preferably at least 1 ppmv, preferably at least 5 ppmv, preferably at least 10 ppmv, preferably at least 15 ppmv, preferably at least 20 ppmv, preferably at least 30 ppmv, preferably at least 40 ppmv, preferably at least 50 ppmv, preferably at least 100 ppmv, preferably at least 150 ppmv, preferably at least 200 ppmv, preferably at least 300 ppmv, preferably at least 400 ppmv, preferably at least 500 ppmv, preferably at least 1000 ppmv, preferably at least 1500 ppmv, preferably at least 2000 ppmv, preferably at least 3000 ppmv, preferably at least 4000 ppmv, preferably at least 5000 ppmv, preferably at least 6000 ppmv, preferably at least 7000 ppmv, preferably at least 8000 ppmv, preferably at least 9000 ppmv, preferably at least 10000 ppmv. The applicants have found that the absorbent streams according to the present invention are particularly effective for removing mercaptans.

In a more preferred embodiment of the process according to the present invention, the feed stream comprises mercaptans, and the amount of mercaptans in the feed stream to step a) is at least 0.1 parts per million by volume [ppmv, herein after], preferably at least 0.5 ppmv, preferably at least 1 ppmv, preferably at least 5 ppmv, preferably at least 10 ppmv, preferably at least 15 ppmv, preferably at least 20 ppmv, preferably at least 30 ppmv, preferably at least 40 ppmv, preferably at least 50 ppmv, preferably at least 100 ppmv, preferably at least 150 ppmv, preferably at least 200 ppmv, preferably at least 300 ppmv, preferably at least 400 ppmv, preferably at least 500 ppmv, preferably at least 600 ppmv, preferably at least 700 ppmv, preferably at least 800 ppmv, preferably at least 900 ppmv, preferably at least 1000 ppmv, preferably at least 1100 ppmv, preferably at least 1200 ppmv, preferably at least 1300 ppmv, preferably at least 1400 ppmv, preferably at least 1500 ppmv, preferably at least 2000 ppmv, preferably at least 3000 ppmv, preferably at least 4000 ppmv, preferably at least 5000 ppmv, preferably at least 6000 ppmv, preferably at least 7000 ppmv, preferably at least 8000 ppmv, preferably at least 9000 ppmv, preferably at least 10000 ppmv. The applicants have found that the absorbent streams according to the present invention are particularly effective for removing mercaptans.

It is further understood that the term "mobile, flowing feed stream" may refer to a liquid or a gaseous mobile, flowing feed stream.

In one embodiment of the process according to the present invention, the feed stream is a gaseous, mobile, flowing feed stream which is contacted with a liquid static absorbent stream. This embodiment is clearly illustrated in the examples below which were performed on lab-scale.

In another embodiment of the process according to the present invention, the feed stream is a liquid or gaseous mobile, flowing feed stream which is contacted with a liquid mobile, flowing absorbent stream. This embodiment is clearly illustrated in absorption tower 1 in FIG. 1, which inherently includes the two stream separations in the tower top and in the tower bottom.

In an embodiment of the process according to the present invention, step a) is performed at a pressure of at least 1 bar gauge, preferably at least 5 bar gauge, preferably at least 10 bar gauge, more preferably at least 15 bar gauge, even more preferably at least 20 bar gauge, yet more preferably at least 25 bar gauge. The applicants have found that the absorbent streams according to the present invention are particularly effective and efficient under these higher pressures as specified.

In an embodiment of the process according to the present invention, step a) is performed at a pressure of at most 150 bar gauge, preferably at most 120 bar gauge, more preferably at most 100 bar gauge, even more preferably at most 90 bar gauge. The applicants have found that higher pressures do not bring much further improvements of performance of the step a). The applicants have found that, if the feed stream needs to be pressurized in order to prepare it for the step a), that further compression energy to reach pressures above the specified levels is usually not justified by the additionally obtainable benefits.

In an embodiment of the process according to the present invention, step a) is performed at a temperature of at least 10° C., preferably at least 20° C., more preferably at least 30° C., even more preferably at least 40° C.

In an embodiment of the process according to the present invention, step a) is performed at a temperature of at most 90° C., preferably at most 80° C., more preferably at most 70° C., even more preferably at most 65° C.

In one embodiment, the process according to the present invention further comprises a step c) in which at least part of the regenerated absorbent stream from step b) may be recycled as at least part of the absorbent stream to step a).

In an embodiment of the process according to the present invention, step b) comprises the step of stripping at least a portion of the contaminant enriched absorbent stream obtained from step a) in counter-current with a gaseous stream containing water vapour in a stripping tower, to form a tower bottom liquid stream which is a first regenerated absorbent stream for the recycling in step c). The applicants have found that steam stripping as prescribed is a very efficient method for breaking the bonds between the contaminant and the absorbent stream, and for separating the contaminant from the absorbent stream.

In an embodiment of the process according to the present invention, step b) comprises the step of flashing at least a portion of the contaminant enriched absorbent stream obtained from step a) to a lower pressure for releasing a gaseous stream containing the contaminant from a liquid stream which is a second regenerated absorbent stream for the recycling in step c). The applicants have found that flashing may be an even more efficient method, as compared to steam stripping, for breaking the bonds between the contaminant and the absorbent stream, and for separating the contaminant from the absorbent stream. The applicants prefer to combine a flashing step with a downstream regeneration step, which preferably is a steam stripping step.

In an embodiment of the process according to the present invention, the second regenerated absorbent stream is recycled to step a). The applicants have found that the flashing step may produce a second regenerated absorbent stream which is suitable for recycling in step c) to step a). This brings the advantage that this part of the absorbent stream does not necessarily need to be processed through a more thorough regeneration step, such as by steam stripping, before it is suitable for participating in the step a).

In an embodiment of the process according to the present invention, in step b) a first regenerated absorbent stream and a second regenerated absorbent stream are formed for the recycling in step c), whereby the second regenerated absorbent stream contains more contaminant than the first regenerated absorbent stream, preferably step a) being performed in an absorption tower and the first regenerated absorbent stream being recycled to a top liquid feed tray in the absorption tower and the second regenerated absorbent stream being recycled to an intermediate feed tray in the absorption tower located lower than the top liquid feed tray. The applicants have found that this embodiment takes full advantage of the presence of a flashing step, without increasing the risk for contaminant breakthrough in the step a), because the feed stream in contact with the second regenerated absorbent stream still has to pass the zone where it is contacted with the first regenerated absorbent stream.

It is further understood that all definitions and preferences as described above for mixture (M) as used in step a) of the process according to the present invention, equally apply for this embodiment and all further embodiments, as described below.

Another aspect of the present invention is the mixture (M), as detailed above.

Another aspect of the present invention is a composition comprising the mixture (M), as detailed above.

A further aspect of the present invention is an absorbent stream comprising the mixture (M), as detailed above.

It is another aspect of the present invention to provide a use of an absorbent stream comprising the mixture (M), as detailed above or at least 15 wt. % of at least one compound (A), as detailed above.

In another aspect, the present invention provides for a contaminant enriched absorbent stream comprising at least one absorbed contaminant selected from hydrogen sulfide ($H_2S$), carbon dioxide ($CO_2$), carbon oxysulfide (COS), carbon disulfide ($CS_2$), disulfides or mercaptans, the absorbent stream comprising the mixture (M), as detailed above or at least 15 wt. % of at least one compound (A), as detailed above.

FIG. 1 is a schematic diagram of an apparatus for removing contaminants according to the process of the present invention from a gaseous feed stream. As shown in FIG. 1, gas feed is led to an absorption tower 1 through a contaminant containing gas-feed inlet 4. In a packed portion 2, the gaseous feed stream placed in the absorption tower 1 is brought into contact in a counter flow with an absorbent stream fed from a nozzle 7, and the contaminant is absorbed and removed from the gas by the absorbent stream, and the contaminant depleted gas is discharged through a contaminant depleted gas-discharge outlet 5. The absorbent stream fed to the absorption tower 1 absorbs the contaminant, and is led to a heat exchanger 14 and a heater 8 and heated and led to a regeneration tower 15. In the regeneration tower 15, the absorbent stream flows through a nozzle 16 and a packed portion 17 toward the lower portion of the tower. During this time, contaminant is removed to regenerate the absorbent stream. A part of the absorbent stream in the bottom of the regenerator tower is routed over reboiler 27 to generate a vapour stream for stripping the absorbent stream coming down the tower. The regenerated absorbent stream is led by a pump 9 to the heat exchanger 14 and an absorbent stream cooler 26 and fed back to the absorption tower 1 through an absorbent stream feed inlet 6.

On the other hand, in the upper portion of the regeneration tower 15, the contaminant removed from the absorbent stream is brought into contact with a reflux water fed from the nozzle 18, and cooled by a regeneration tower reflux condenser 23, and, in a reflux drum 21, the gaseous contaminant is separated from the reflux water formed by condensing water vapour accompanying the contaminant, and may be led to a contaminant recovery step through a recovered contaminant line 22. The reflux water is fed by a reflux water pump 20 to the regeneration tower 15.

EXAMPLES

The invention will be now described in more details with reference to the following examples, whose purpose is merely illustrative and not intended to limit the scope of the invention.

General Procedure for Determination of the Absorption Capacities

All experiments were performed using 30 g of an absorbent stream. Lab-scale absorption experiments were carried out by contacting a feed stream gas mixture comprising 1000 ppmv (parts per million by volume) n-butane and 1000 ppmv methyl mercaptan ($CH_3SH$) in nitrogen with the various absorbent streams, at a temperature of 40° C. and a pressure of 2 bar. The experimental absorption apparatus was comprising a double-walled tubular absorber with a diameter of 7 mm, equipped with a thermocouple and heated by a water bath. The pressure inside the absorber was maintained at a constant pressure using a back-pressure regulator mounted downstream of the tubular absorber. The gas flow rate was 5.1 $L \cdot h^{-1}$, and the outlet gas passed through a condenser to avoid evaporation of water from the absorber. When the feed stream gas mixture was passed in an upward direction through the absorbent stream, the resulting contaminant depleted product stream gas was depleted in n-butane and methyl mercaptan until the contaminant enriched absorbent stream became saturated. The composition of the outlet gas was analysed at regular intervals using an Agilent 7890B Gas Chromatograph (GC) equipped with a split injector and a flame ionization detector (290° C.). A capillary Rtx-Volatile Amine Column with dimensions of 60-meter×0.32-mm ID was employed. The GC oven temperature was set at 40° C. and gas samples were injected with a split ratio of 100:1. OpenLAB Chromatography Data Systems software was used for data acquisition and data processing. Once at room temperature, the absorber was opened, contents transferred to a glass jar, and sampled for GC analysis to determine the composition. The absorbent streams were evaluated in five consecutive absorption-regeneration cycles whereby regeneration was performed by heating the solvents for 90 minutes at temperatures of at least 80° C. and a gas flow rate of 5.1 $L\,h^{-1}$. Data of the first two cycles were not incorporated into the analysis in order to make sure that the absorption apparatus was fully equilibrated.

To compare the performance of the different absorbent streams, the concentration of methyl mercaptan and n-butane in the outlet gas was followed in time. As long as the absorbent streams were not saturated, the concentration of methyl mercaptan and/or n-butane in the outlet gas was zero. Once the absorbent streams were nearing saturation, the outlet concentrations of methyl mercaptan and/or n-butane (in ppmv) started to increase (i.e. breakthrough). For the different absorbent streams, this breakthrough took place at a different time. The solvent loadings were approximated by integrating the areas above these respective "breakthrough" curves (i.e. the ppmv concentration of methyl mercaptan or n-butane in the outlet gas as a function of time (in minutes)) and by subtracting the amount of gas used to fill the head space of the absorber. The amount of absorbed methyl mercaptan and n-butane was calculated by writing:

$$n_{absorbed} = AREA_{above\ curve} * \frac{\dot{V}}{1000*60} * \frac{10^{-6}}{8.3143} * \frac{101325}{273.15} * \frac{1}{m}$$

wherein $\dot{V}$ is the flow rate of the gas phase (NL·h$^{-1}$) and m the total mass of absorbent stream (g).

The list of used materials according to the invention can be found in Table 1.

TABLE 1

List of products and description

| Compound (A) according to the invention | Description |
|---|---|
| DMAP-2-pyrrolidone | Dimethylaminopropyl-2-pyrrolidone |
| DMAE-2-pyrrolidone | Dimethylaminoethyl-2-pyrrolidone |

| Compound (B) according to the invention | Description |
|---|---|
| N-tert-butyl-2-pyrrolidone | N-tert-butyl-2-pyrrolidone |
| N-butyl-2-pyrrolidone | N-butyl-2-pyrrolidone |
| N-octyl-2-pyrrolidone | N-octyl-2-pyrrolidone |
| MDEA | Methyldiethanolamine |

TABLE 1-continued

List of products and description

| Reference compound | Description |
|---|---|
| Sulfolane | Sulfolane |
| 2-Pyrrolidone | 2-Pyrrolidone |
| N-methyl-2-pyrrolidone | N-methyl-2-pyrrolidone |

Absorption Performance

Example 1-2

The absorbent stream of Examples 1-2 was a mixture (M) which was prepared by mixing 25 wt. % of a compound (B), with 50 wt. % of MDEA (i.e. compound (C)), and 25 wt. % of water. The absorption performance data and the specific compounds (B) that were used are summarized in Table 2 below.

Example 3-4

The absorbent stream of Examples 3-4 was a composition (C) which was prepared by mixing 25 wt. % of a compound (A), with 50 wt. % of MDEA (i.e. compound C), and 25 wt. % of water. The absorption performance data and the specific compounds (A) that were used are summarized in Table 2 below.

Comparative Examples 5-7

The absorbent streams of Comparative Examples 5 to 7 were prepared according to the same procedure as Examples 1 to 2 except that a reference compound was used which was not a compound (B) according to general formula (II). Specifically, in Comparative Example 5, sulfolane was used, in Comparative Example 6, 2-pyrrolidone was used and in Comparative Example 7, N-methyl-2-pyrrolidone was used. The absorption performance data of Comparative Example 5 were considered as a reference since the absorbent stream comprising sulfolane is similar to the well-known commercial Sulfinol®-M solvent. The absorption performance data are summarized in Table 2 below.

TABLE 2

| Name | Reference or compound (A) or compound (B) | CH$_3$SH concentration (mmol. kg$^{-1}$ solvent) | | | n-Butane concentration (mmol. kg$^{-1}$ solvent) | | |
|---|---|---|---|---|---|---|---|
| | | 1 | 2 | 3 | 1 | 2 | 3 |
| Example 1 | N-Butyl-2-pyrrolidone | 4.11 | 5.64 | 5.50 | 0.35 | 0.33 | 0.37 |
| Example 2 | N-Octyl-2-pyrrolidone | 4.09 | 4.13 | N.D. | 0.47 | 0.45 | N.D. |
| Example 3 | DMAP-2-pyrrolidone | 4.10 | 4.44 | 4.16 | 0.31 | 0.26 | 0.31 |
| Example 4 | DMAE-2-pyrrolidone | 4.12 | 4.21 | 4.13 | 0.34 | 0.25 | 0.35 |
| Comparative Example 5 | Sulfolane | 3.64 | 3.66 | 3.67 | 0.30 | 0.26 | 0.35 |
| Comparative Example 6 | 2-Pyrrolidone | 3.17 | 3.00 | 3.05 | 0.23 | 0.20 | 0.28 |
| Comparative Example 7 | N-Methyl-2-pyrrolidone | 3.54 | 3.68 | 4.02 | 0.34 | 0.26 | 0.27 |

For comparison purposes, it should be noted that the reference absorbent solution of Comparative Example 5 comprising sulfolane, could capture 3.64-3.67 mmol CH$_3$SH and 0.26-0.35 mmol C$_4$H$_{10}$ per kg solvent (Table 2). In the case of N-butyl-2-pyrrolidone (Example 1), CH$_3$SH loadings of between 4.11-5.64 mmol and C$_4$—H$_{10}$ loadings of between 0.33-0.37 mmol per kg solvent, were observed. Under the same conditions, the results also indicate that the CH$_3$SH absorption capacities of N-octyl-2-pyrrolidone (Example 2), DMAP-2-pyrrolidone (Example 3), and DMAE-2-pyrrolidone (Example 4) were comparable or superior to those of the reference absorbent solution of Comparative Example 5 comprising sulfolane. We inferred that these specific substitutions on the amide nitrogen of the pyrrolidone ring positively impact the interactions of the absorbent stream with the mercaptans while a low co-absorption of hydrocarbons (such as n-butane) is maintained. Table 2 further indicates that the CH$_3$SH absorption values of the absorbent streams according to the present invention (Examples 1-4) were comparable or superior to those of the comparative absorbent solutions of Comparative Examples 5-7.

Example 8

The absorbent stream of Example 8 was a mixture (M) which was prepared by mixing 30 wt. % of N-butyl-2-pyrrolidone (i.e. compound (B)), with 50 wt. % of MDEA (i.e. compound (C)), and 25 wt. % of water. The absorption performance data are summarized in Table 3 below.

Comparative Example 9

The absorbent stream of Comparative Example 9 was prepared according to the same procedure as Example 8 except that 30 wt. % of sulfolane was used which was not a compound (B) according to general formula (II). The absorption performance data are summarized in Table 3 below.

Table 3 shows typical absorption data ($n_{absorbed}$) for three consecutive absorption-regeneration cycles for the reference absorbent stream of Comparative Example 9 comprising 30 wt. % sulfolane and the absorbent stream according to the invention comprising 30 wt. % of n-butyl-2-pyrrolidone (i.e. compound B) (Example 8).

TABLE 3

| Name | Reference or compound B | $CH_3SH$ concentration (mmol. $kg^{-1}$ solvent) | | | n-Butane concentration (mmol. $kg^{-1}$ solvent) | | |
|---|---|---|---|---|---|---|---|
| | | 1 | 2 | 3 | 1 | 2 | 3 |
| Example 8 | N-Butyl-2-pyrrolidone | 8.46 | 7.75 | 7.58 | 0.43 | 0.46 | 0.36 |
| Comparative Example 9 | Sulfolane | 5.22 | 4.91 | 5.35 | 0.33 | 0.33 | 0.37 |

Example 10

The absorbent stream of Example 10 was a mixture (M) which was prepared by mixing 15 wt. % of N-butyl-2-pyrrolidone (i.e. compound (B)), with 50 wt. % of MDEA (i.e. compound (C)), and 25 wt. % of water. The absorption performance data are summarized in Table 4 below.

Comparative Example 11

The absorbent stream of Comparative Example 11 was prepared according to the same procedure as Example 10 except that 15 wt. % of sulfolane was used which was not a compound (B) according to general formula (II). The absorption performance data are summarized in Table 4 below.

Table 4 shows typical absorption data ($n_{absorbed}$) for three consecutive absorption-regeneration cycles for the reference absorbent stream of Comparative Example 11 comprising 15 wt. % sulfolane and the absorbent stream according to the invention comprising 15 wt. % of n-butyl-2-pyrrolidone (i.e. compound B) (Example 10).

TABLE 4

| Name | Reference or compound B | $CH_3SH$ concentration (mmol. $kg^{-1}$ solvent) | | | n-Butane concentration (mmol. $kg^{-1}$ solvent) | | |
|---|---|---|---|---|---|---|---|
| | | 1 | 2 | 3 | 1 | 2 | 3 |
| Example 10 | N-Butyl-2-pyrrolidone | 4.76 | 5.11 | 4.61 | 0.33 | 0.36 | 0.40 |
| Comparative Example 11 | Sulfolane | 4.08 | 4.21 | 4.08 | 0.20 | 0.24 | 0.24 |

The effect of a different concentration of compound B was studied by varying the ratio of the different absorbent stream components (Example 8 and 10) and by comparing the results with a reference absorbent stream comprising sulfolane (Comparative Examples 9 and 11). The absorbent solutions according to the invention comprising N-butyl-2-pyrrolidone showed a consistently higher solubility of $CH_3SH$ compared to the reference absorbent solutions of the Comparative Examples while the co-absorption of n-butane remained low.

The invention claimed is:

1. A process comprising:
   step a) contacting a feed stream comprising a contaminant with an absorbent stream in a counter-current flow to produce a contaminant depleted product stream depleted in the molar quantity of the contaminant relative to the molar quantity of said contaminant in the feed stream, and a contaminant enriched absorbent stream enriched in the molar quantity of the contaminant relative to the molar quantity of said contaminant in the absorbent stream; and step b) treating the contaminant enriched absorbent stream to form a gaseous stream comprising said contaminant and a regenerated absorbent stream lean in the molar quantity of said contaminant relative to the molar quantity of said contaminant in the contaminant enriched absorbent stream;

wherein said absorbent stream comprises:
   i. at least 15 weight percent (wt. % herein after), relative to the total weight of the absorbent stream, of at least one substituted 2-pyrrolidone of general formula (I-a) [compound (A), herein after]:

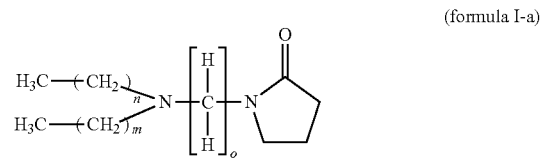

(formula I-a)

wherein:
o is an integer in the range from 2 to 4; n is an integer selected from 0 or 1; m is an integer selected from 0 or 1.

2. The process according to claim 1, wherein the molar quantity of the contaminant in the contaminant depleted product stream, relative to the molar quantity of the contaminant in the feed stream, is reduced by at least 5%.

3. The process according to claim 1, wherein the absorbent stream comprises a composition [composition (C), herein after], comprising at least 15 wt. % of the at least one compound (A), relative to the total weight of the composition (C), at least one compound (C) and water.

4. The process according to claim 3, wherein the absorbent stream comprises the composition (C) and wherein the weight ratio of the water to the compound (A) is at least 0.25:1.

5. The process according to claim 3, wherein the absorbent stream comprises the composition (C) and wherein the weight percent of the compound (A) comprised in the composition (C), relative to the total weight of the composition (C), is equal to or greater than 18 wt. %.

6. The process according to claim 3, wherein the absorbent stream comprises the composition (C) and wherein the weight percent of the compound (C) comprised in the composition (C), relative to the total weight of the composition (C), is equal to or greater than 2 wt. %.

7. The process according to claim 1, wherein the absorbent stream further comprises an accelerator selected from amines, alcohols, ketones, vinyl alcohols, vinyl ketones, ether alcohols, ether ketones, glycols, polyethylene glycols, polypropylene glycols, ethylene glycolpropylene glycol copolymers, glycol ethers, thioglycols, thioalcohols, sulfones, sulfoxide, N-alkylated 2-pyrrolidones, N-alkylated piperidones, cyclotetramethylenesulfones, N-alkylformamides, N-alkylacetamides, alkyl phosphates, alkylene carbonates and/or dialkyl carbonates, and combinations or mixtures thereof.

8. The process according to claim 7, wherein the absorbent stream comprises from 0.1 to 20 wt. % of the accelerator.

* * * * *